US006302294B1

(12) United States Patent
Collier et al.

(10) Patent No.: US 6,302,294 B1
(45) Date of Patent: Oct. 16, 2001

(54) ROLLED COIN DISPENSER

(75) Inventors: William S. Collier, Land of Lakes; Alan M. Stone, Tampa, both of FL (US)

(73) Assignee: Collier Safe Company, Inc., Odessa, FL (US)

( * ) Notice: Subject to any disclaimer, the term of this patent is extended or adjusted under 35 U.S.C. 154(b) by 0 days.

(21) Appl. No.: 09/436,211

(22) Filed: Nov. 8, 1999

(51) Int. Cl.[7] .................................................... B65G 59/00
(52) U.S. Cl. ............................................ 221/131; 221/197
(58) Field of Search .................................... 221/7, 13, 15, 221/197, 131, 266, 92, 112, 103, 226, 232; 194/206, 350

(56) References Cited

U.S. PATENT DOCUMENTS

| | | | |
|---|---|---|---|
| 923,132 | 6/1909 | Bishop et al. . | |
| 1,857,881 | 5/1932 | Scott et al. . | |
| 3,825,115 | 7/1974 | Black et al. . | |
| 3,866,388 | 2/1975 | Koehler, III . | |
| 4,043,444 | 8/1977 | Bobeczko . | |
| 4,050,218 | 9/1977 | Call . | |
| 4,469,245 | 9/1984 | Fish et al. . | |
| 4,717,044 | 1/1988 | Suzuki et al. . | |
| 4,840,290 | 6/1989 | Nakamura et al. . | |
| 4,850,511 * | 7/1989 | Kral et al. | 221/197 |
| 4,860,922 | 8/1989 | Malservisi et al. . | |
| 4,940,162 | 7/1990 | Thie . | |
| 4,966,304 * | 10/1990 | Kelly | 221/6 |
| 5,005,339 | 4/1991 | Capawana . | |
| 5,377,864 * | 1/1995 | Blechl et al. | 221/197 |
| 5,722,564 | 3/1998 | Tiraboschi . | |
| 5,743,429 | 4/1998 | Morofsky . | |

* cited by examiner

*Primary Examiner*—Kenneth W. Noland
(74) *Attorney, Agent, or Firm*—Hall, Priddy, Myers & Vande Sande

(57) ABSTRACT

An automatic rolled coin dispenser for quickly and automatically dispensing a pre-selected number of paper or plastic wrapped rolls of coins. The dispenser further provides a large coin storage capacity, speed loading capability, as well as the ability to dispense multiple denominations of rolled coins simultaneously.

28 Claims, 5 Drawing Sheets

FIG. 2
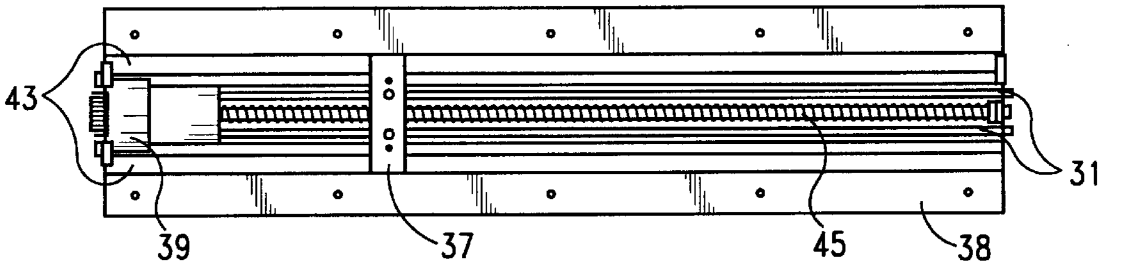
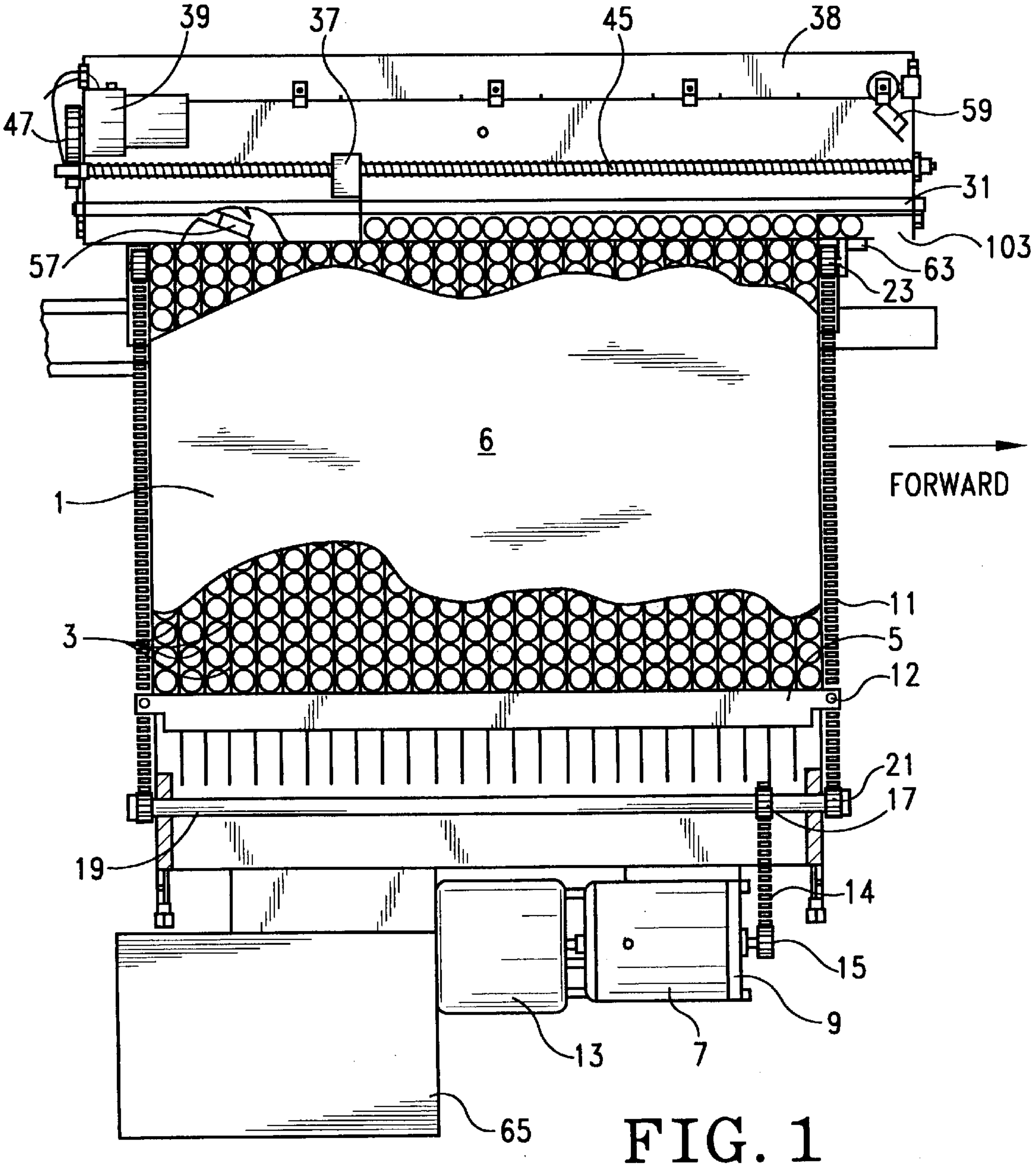
FIG. 1

FIG. 7
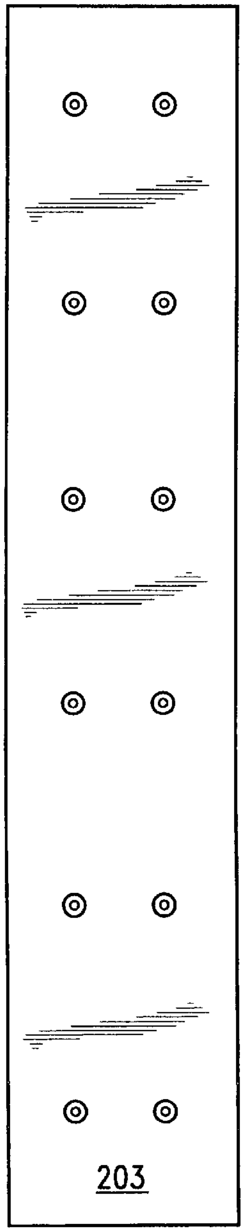
FIG. 8
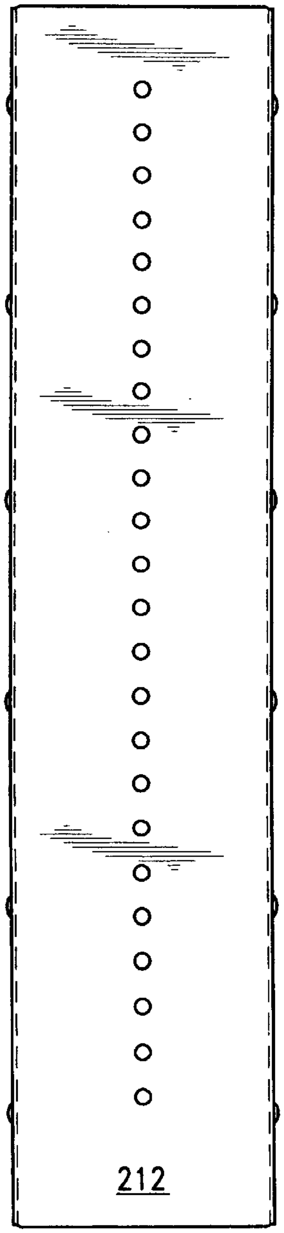
FIG. 6
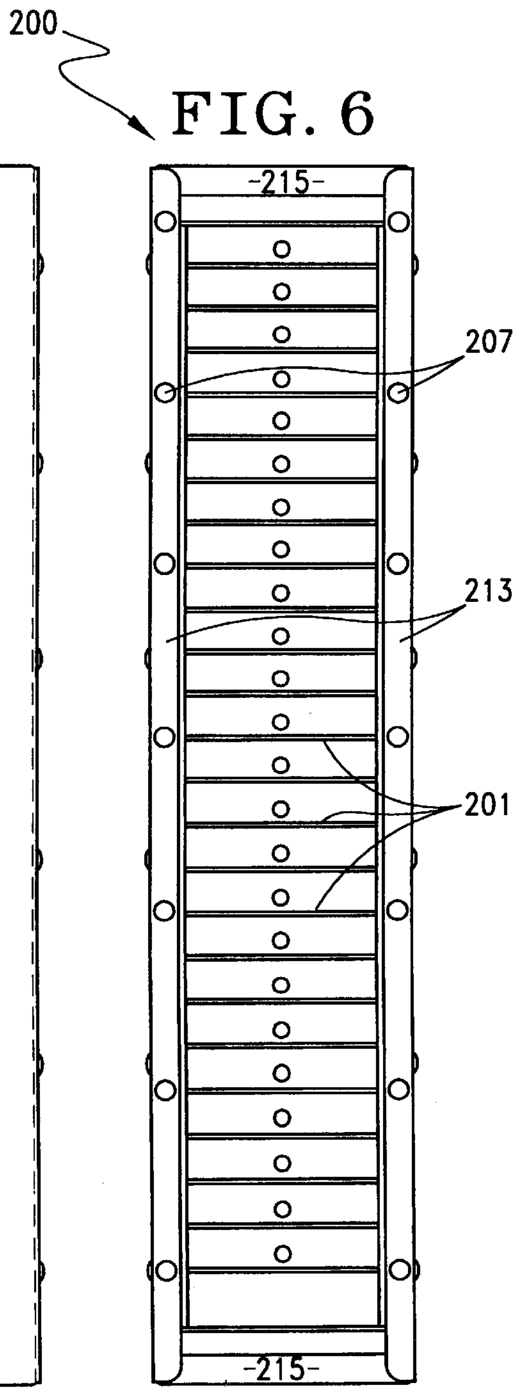
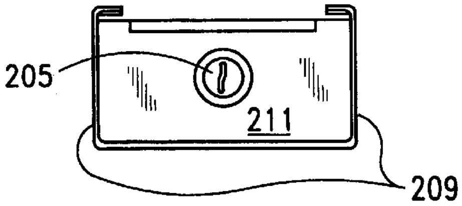
FIG. 9

ROLLED COIN DISPENSER

FIELD OF THE INVENTION

This invention relates to a rolled coin dispenser for automatically dispensing a pre-selected number of rolls of coins. More particularly, this invention relates to an automatic rolled coin dispenser which is capable of dispensing both paper and plastic wrapped rolls of coins both quickly and in large volume.

BACKGROUND OF THE INVENTION

In industries which handle large volumes of coins, such as in banks or casinos, it is desirable to have a safe, accurate, and efficient way to distribute or access high volumes of coins with limited human intervention. Many types of automated rolled coin dispensing machines have been developed for this purpose, particularly for use where such large volumes of change are needed or distributed. Where such machines are used, it is usually desirable that the dispensers be fast, have large capacity, and be both reliable and flexible in operation.

As illustrated in U.S. Pat. Nos. 4,860,922; 4,940,162; and 5,005,339, automated rolled coin dispensers heretofore have frequently relied on gravity or hopper type dispensing systems. These systems store coins in a bin or reservoir and dispense coins by utilizing the weight of the coin rolls themselves to move them through an opening or outlet at the bottom of the coin storage area. Such devices prior to this invention have generally had one or more drawbacks associated with their use. In particular, many of these machines are incapable of reliably handling both paper and plastic wrapped rolls of coins. Because of the nature of plastic wrapped coins, if they are subjected to unusual stresses, they often break or tear open. Hopper or gravity type dispensers are thus often subject to this problem because such machines often store coins stacked rather unevenly, and the weight of the bulk of the coins imparts substantial stress upon the bottom-most rolls of coins. These stresses frequently cause broken or torn rolls and render such machines less than desirable for use with plastic wrapped coinage.

In addition to the above, hopper or gravity type dispensers are often subject to jamming. This is because such dispensers usually store coins without partitions or dividers. As the coins move by gravity towards the outlet of the dispenser, there is nothing to guide their path and they often "bridge" or jam.

When coin rolls "bridge", rolls adjacent to each other settle into the form of an arch as coins below the "bridge" are removed or dispensed. The strength of such a "bridge" is actually reinforced by the weight of the coins above and usually occurs just above the outlet of the bin or reservoir, blocking any further dispensing of coins. In such a machine, frequent service is often necessary.

Other automated rolled coin dispensers known in the art rely on one or a combination of ramps, "pickers", or extensive or complicated conveyor systems. These coin dispensers are often slow, complicated, of insufficient capacity, or subject to one of several types of jamming. Examples of these known dispensers are illustrated in U.S. Pat. Nos. 3,825,115; 4,469,245; 4,717,044; 4,840,290; 4,966,304; 5,722,564. As can be seen, such dispensers rely on ramps, conveyors, or "picker" systems which slowly and often circuitously transport coin rolls from the coin storage area to the dispenser outlet area. In one such prior art system, for example, a roll of coins is transported from storage via a conveyor, picked from the conveyor by a "picker" (a cylinder with a recess for acceptance of a coin roll), and ultimately placed onto a ramp for dispensing. Such a system is inefficient in that it must employ extra steps in the dispensing process and does not dispense coins directly from the coin storage area. Due to their complexity, these types of dispensers are also subject to jamming as coin rolls travel down ramps or along conveyors towards their eventual destination at an outlet or dispensing area. Additionally, many of these dispensers do not store a sufficient capacity of coins where the demand is for a large volume of coin flow. Such dispensers, if employed for high volume usage, often require frequent reloading.

In view of the above, it is apparent that there exists a need in the art for a rolled coin dispenser which is not subject to the above drawbacks. It is a purpose of this invention to fulfill this need in the art, as well as other needs which will become more apparent to the skilled artisan once given the following disclosure.

SUMMARY OF THE INVENTION

Generally speaking, this invention fulfills the above-described needs in the art by providing a rolled coin dispenser apparatus comprising in combination: a magazine, the magazine including vertical partitions and being capable of storing multiple vertical columns of rolled coins within the vertical partitions; an elevator, the elevator being capable of movably supporting rolls of coins within the magazine at the bottom roll of each vertical column of coins, an elevator motor for powering the elevator, an elevator controlling means for controlling the elevators vertical height by activating or deactivating the elevator motor, a sensing means for sensing the elevators vertical height and for communicating with the controlling means, a shuttle capable of pushing a pre-selected number of coin rolls from a horizontal row of rolls formed by the top roll of each vertical column of coins through an outlet for dispensing, a shuttle motor for powering the shuttle, and a shuttle controlling means for controlling the shuttle by activating or deactivating the shuttle motor.

Included in a further embodiment is a coin proximity sensor capable of communicating data to the controlling means and so located so that as coin rolls are dispensed they are sensed by the coin proximity sensor.

In certain other embodiments there is provided a rolled coin dispensing machine, wherein multiple rolled coin dispensing apparatuses are utilized, which is capable of dispensing multiple denominations of rolled coins simultaneously.

In yet a further embodiment, a rolled coin loading cassette is provided which comprises a partitioned coin storage compartment capable of storing multiple horizontally stacked vertical columns of rolled coins and a lid which is slidably removable; whereby when the lid is removed, coins may be loaded into the partitioned coin storage compartment and stored by replacing the removable lid. When the partitioned coin storage compartment is loaded with coins, the coins may be quickly deposited into a rolled coin dispenser apparatus by aligning the rolled coin loading cassette with a rolled coin dispenser apparatus and slidably removing the lid.

This invention will now be described with respect to certain embodiments thereof as set forth in the accompanying illustrations, wherein:

IN THE DRAWINGS

FIG. 1 is a side view of a rolled coin dispenser apparatus according to the subject invention with certain parts shown in x-ray.

FIG. 2 is an underside view of a shuttle system frame and its accompanying parts according to the embodiment of FIG. 1.

FIG. 6 is top view of a coin loading cassette according to the subject invention.

FIG. 7 illustrates a top view of the coin loading cassette lid according to the embodiment of FIG. 6.

FIG. 8 illustrates a cassette bottom of a coin loading cassette according to the embodiment of FIG. 6.

FIG. 9 is an end view of a coin loading cassette according to the embodiment of FIG. 6.

DETAILED DESCRIPTION OF CERTAIN EMBODIMENTS

Figure 3:
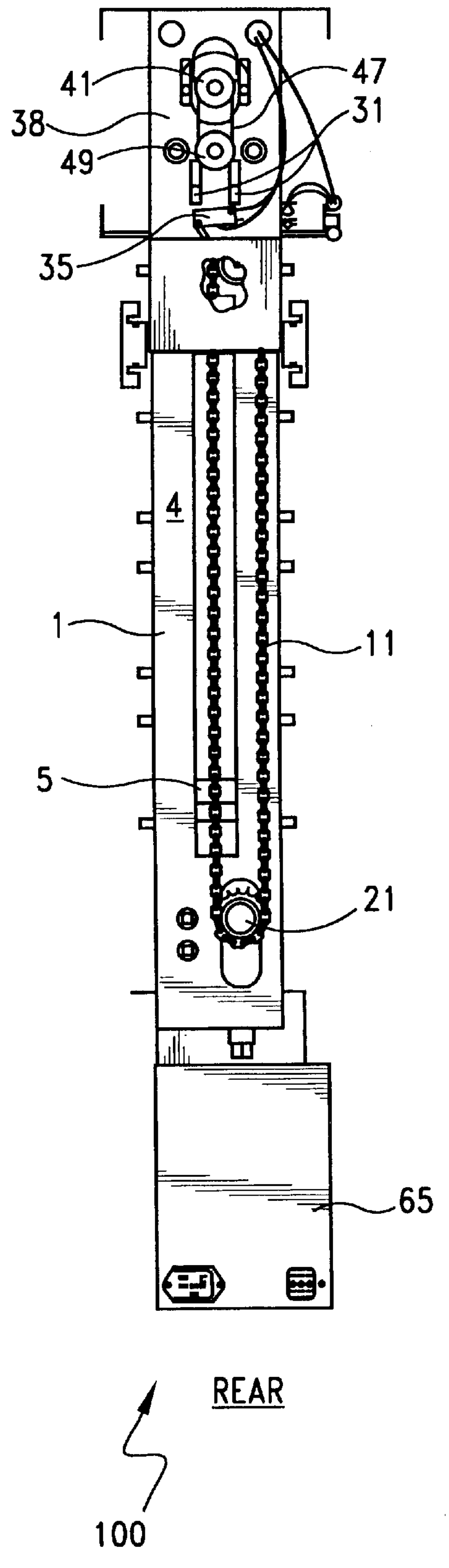
FIG. 3 is a rear view of a rolled coin dispenser apparatus according to the subject invention with certain parts shown in x-ray.

Referring now to FIGS. 1, 2, 3 and 4, there is illustrated a rolled coin dispenser apparatus indicated at 100 as one exemplar embodiment according to the subject invention. Generally speaking, the rolled coin dispenser 100 includes a magazine 1 with vertical partitions 3 for storage of rolled coins, an elevator 5 for moveably supporting rolled coins within the magazine 1, and a shuttle 37 designed to dispense rolled coins upon demand, across a coin proximity sensor 63. Further illustrated in FIG. 1 is a programmable logic control module 65 (hereinafter “PLC”) for controlling the operation of the rolled coin dispenser 100. PLC 65 works in conjunction with a computer and a user interface as will be described in more detail below (both standard in the art and not shown for sake of clarity).

More specifically, magazine 1 comprises two vertically disposed side walls 6 only partially shown so as to expose the inner structure of magazine 1, two end walls 4, and vertical partitions 3 spaced evenly throughout magazine 1 with the top end portion of magazine 1 left open. Each end wall 4 contains a channel or opening to allow for the connection and movement of an elevator 5 as will be described in more detail below. Each vertical partition 3 extends between and is attached perpendicularly to both of the vertically disposed side walls of magazine 1.

The spacing between vertical partitions 3 and the distance between the side walls of the magazine 1 is adjusted to account for the different sizes of particular denominations of coin rolls so that coin rolls may be stacked lying horizontally within the magazine 1 and between the vertical partitions 3. Coins stacked within magazine 1 will form multiple vertical columns of coins with each coin roll being vertically supported by another coin roll (or the elevator 5) below it. The spacing between each vertical partition 3 should be such that coin rolls stacked therein should not be readily subject to undesired lateral movement, twisting, or jamming within the vertical partitions 3.

Figure 4:
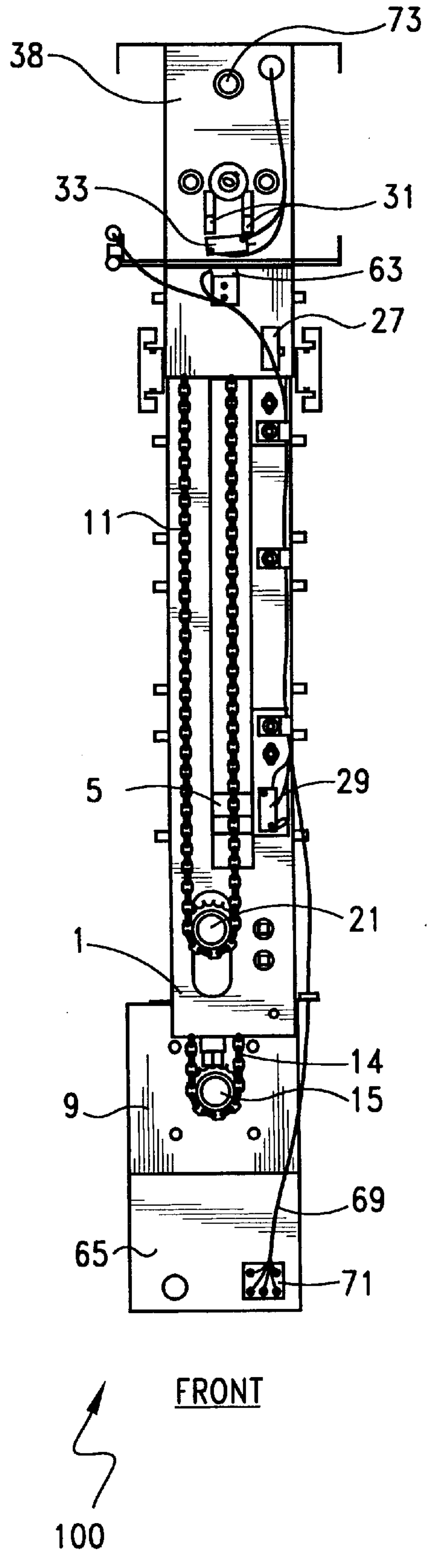
FIG. 4 is a front view of a rolled coin dispenser apparatus according to the subject invention.

Referring now to FIGS. 1, 3, and 4, elevator 5 provides support for coin rolls stacked vertically within magazine 1 by supporting the bottom most roll of each vertical column of coins. Elevator 5 is moveably disposed within magazine 1 and primarily serves to raise the upper most roll of each vertical column of coins to a position just clear of the vertical partitions 3 of magazine 1 for dispensing. Generally speaking, elevator 5 is powered vertically by elevator motor 7 which is controlled by a PLC indicated at 65.

More particularly, elevator 5 is connected at each of its longitudinal ends to elevator chains 11 by roll pins 12 (through channels in each of end walls 4) which serve to carry elevator 5 in both vertical directions. Elevator chains 11 are trained over vertically spaced upper elevator sprockets 23 and elevator drive sprockets 21. Each upper elevator sprocket 23 is rotatably attached to magazine 1 near the top of end walls 4. Elevator drive sprockets 21 are fixedly attached to elevator drive shaft 19 which spans the length of magazine 1 at its lower portion and is rotatably attached to magazine 1 through openings in each of end walls 4. Further fixedly attached to elevator drive shaft 19 is elevator drive shaft motor sprocket 17 which serves to transfer rotational force produced by elevator motor 7 to elevator drive shaft 19 via elevator motor chain 14. Elevator drive shaft motor sprocket 17 can be located anywhere convenient on elevator drive shaft 19, depending primarily on the mounting location of elevator motor 7. Elevator motor chain 14 drives elevator drive shaft 19 and is trained over vertically spaced elevator drive shaft motor sprocket 17 and elevator motor sprocket 15. Elevator motor 7 mounts to rolled coin dispenser 100 via elevator motor mount 9 at any position appropriate for driving elevator drive shaft 19. Included on elevator motor 7 is elevator motor brake 13 (as well known and standard in the art) to aid in quick and accurate stopping of elevator 5.

Referring to FIGS. 3 and 4, the vertical height of elevator 5 is generally controlled by a PLC 65 (which controls the elevator motor 7) interacting with a computer (not shown) and user interface (not shown), and is sensed by at least one sensor which interacts with at least one switch. Sensors and switches communicate with PLC 65 via control wire 69 attached at control wire receptacle 71. In this particular embodiment of the subject invention, elevator 5 is limited to a minimum vertical height by lower elevator limit switch 29. During the coin loading process, for example, when it is necessary to lower elevator 5, lower elevator limit switch 29 will prevent elevator 5 from being lowered to a position beyond the confines of the walls of magazine 1. When elevator 5 trips or activates lower elevator switch 29, PLC 65 will halt the operation of elevator motor 7 aided by elevator brake 13.

Conversely, the raising of elevator 5 is controlled by two different mechanisms. The maximum vertical height of elevator 5 is limited by upper elevator limit switch 27. When elevator 5 trips or activates upper elevator limit switch 27, PLC 65 will halt the operation of elevator motor 7 again aided by elevator brake 13, thereby stopping the vertical travel of elevator 5. Further limiting elevator 5 in its upward vertical direction are sensor bars 31, front sensor bar switch 33, and rear sensor bar switch 35. In this embodiment of the invention, sensor bars 31 are mounted to shuttle system frame 38 above the top open end of magazine 1, with sensor bar switches 33 and 35 being mounted in communication with sensor bars 31 at their respective front and rear positions. When magazine 1 contains rolls of coins and elevator 5 is caused to travel in an upward vertical direction, the vertical columns of coin rolls are raised and the uppermost coin rolls ultimately come into contact with sensor bars 31. When this happens, sensor bars 31 actuate respective front and rear sensor bar switches 33 and 35 which, in turn, communicate to PLC 65 via control wire 69 that the upward vertical travel of elevator 5 should be stopped. The positions of sensor bars 31 are, of. course, adjusted to ensure that the upper most coin roll of each vertical column of coins is elevated to a height free of the vertical partitions 3 appropriate for relatively trouble free coin roll dispensing.

Further provided for manually controlling the vertical height of elevator 5 is load/service button 73 which functions in cooperation with shuttle system frame switch 57. Shuttle system frame 38 is tiltably mounted to magazine 1 as will be described in more detail below. When shuttle system frame 38 is in the tilted or open position, shuttle system frame switch 57 communicates with load/service button 73 to allow for the lowering of elevator 5 when load/service button 73 is pushed. Conversely, when shuttle system frame 38 is in the closed position (eg. as illustrated in FIG. 5), shuttle system frame switch 57 communicates with load/service button 73 to allow for the raising of elevator 5.

Figure 5:
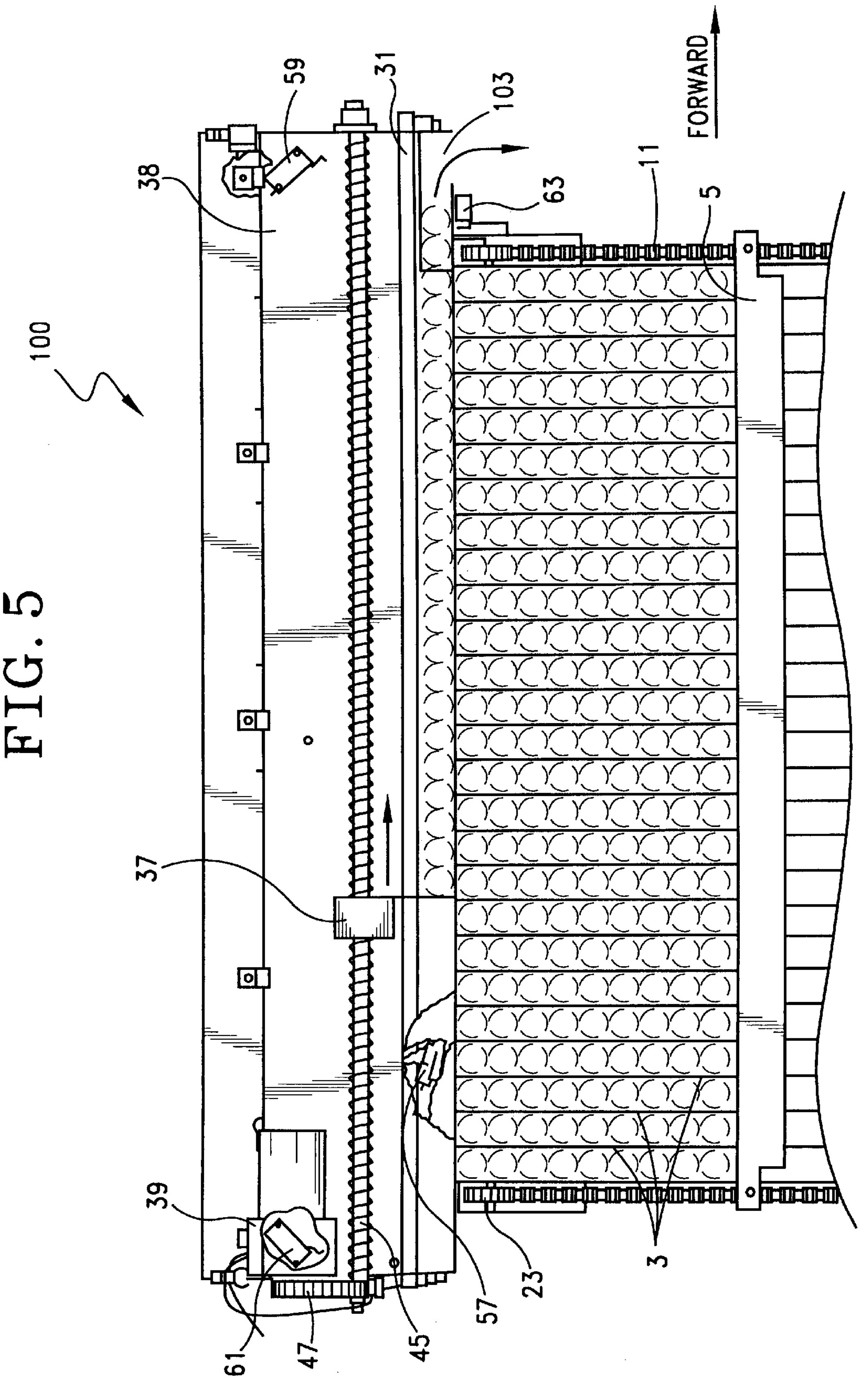
FIG. 5 is a partial side view of the embodiment of FIG. 1 illustrating the rolled coin dispenser apparatus in operation, shown with certain parts removed for clarity.

Referring now to FIGS. 1, 2, and 5, a shuttle 37 is shown which is designed to operate in conjunction with a coin proximity sensor 63 (eg. a Pepperl & Fuchs Part No. NBW4-F29-EO) to dispense a pre-selected number of rolls of coins when they are ordered by a customer via a user interface. When rolls of coins are ordered, shuttle 37 pushes rolls of coins from a horizontal row of coin rolls across coin proximity sensor 63, and into a dispensing tray (not shown). Generally speaking, shuttle 37 is powered by shuttle motor 39 along lead screw 45. Lead screw 45 is a, threaded rod rotatably fixed to shuttle system frame 38 at a position substantially directly above the open top end of magazine 1. Shuttle system frame 38 is tiltably mounted at the top open end of magazine 1 to allow for convenient access and loading of coin rolls into magazine 1. Shuttle 37 has an opening through its center containing threads complimentary to those of lead screw 45 and is specifically designed to travel in both directions along the length of magazine 1 by interacting with the threads of lead screw 45 as lead screw 45 is caused to rotate. Further provided are shuttle guide bars 43, fixedly attached the length of shuttle system frame 38 to prevent shuttle 37 from rotating about lead screw 45 as it travels. When operated, shuttle motor 39 drives a shuttle drive belt 47 which is trained over lead screw pulley 49. Lead screw pulley 49 is fixed to one end of lead screw 45, and as shuttle motor 39 drives shuttle drive belt 47, it in turn, causes lead screw pulley 49 and connected lead screw 45 to rotate in the corresponding direction. As lead screw 45 rotates, its threads communicate with the threads of shuttle 37, causing shuttle 37 to move in a horizontal direction along the length of lead screw 45. The direction and duration of rotation of lead screw 45 is determined by PLC 65 (and a computer and user interface not shown) which ultimately determines the direction and length of travel of shuttle 37 along the top open end of magazine 1.

The horizontal travel of shuttle 37 is further limited by front and rear shuttle limit switches 59 and 61, mounted at their respective front and rear positions on shuttle system frame 38 above lead screw 45. When shuttle 37 trips one of these switches, shuttle motor 39 is halted. If shuttle 37 has contacted front shuttle limit switch 59, shuttle motor 39 will then reverse and return shuttle 37 to its starting position at rear shuttle limit switch 61, where it is ready for dispensing a new horizontal row of rolled coins.

The system illustrated in FIGS. 1–5 operates as follows:

When the rolled coin dispenser apparatus 100 is first loaded to capacity with coin rolls, elevator 5 is advanced to a position such that the top or uppermost roll of each vertical column of coins is just free of the vertical partitions 3 of magazine 1. This height is determined by the combination of sensor bars 31 and front and rear sensor bar switches 33 and 35. At this position, the uppermost rolls of each vertical column of coins together form a singular horizontal row of coin rolls resting just clear of vertical partitions 3 ready for dispensing.

When a customer orders coins from the rolled coin dispenser apparatus 100, usually in exchange for paper currency, or charge to a credit or point of sale card, the customer indicates the number of coin rolls desired by utilizing a user interface which, in this particular embodiment, is a touch screen similar to that found on ATM machines or other known device. Once the customer orders the coins, the computer checks for appropriate inventory and then together through the PLC 65, sets shuttle 37 in motion by activating shuttle motor 39. When shuttle motor 39 is activated, it turns lead screw 45 in the direction appropriate for forward travel of shuttle 37, causing shuttle 37 to advance forward (in the direction as indicated by the arrow in FIG. 5) and push the horizontal row of coin rolls towards the dispenser outlet, generally indicated at 103. As the horizontal row of coin rolls is pushed, the forward most coin roll in the horizontal row of coin rolls will pass over a coin proximity sensor 63 mounted on magazine 1 at outlet 103. As this coin roll passes over coin proximity sensor 63, a signal is sent via control wire 69 indicating that a coin roll is in the process of being dispensed. Immediately after this forward most coin roll passes over coin proximity sensor 63, it falls through outlet 103 (as indicated by a second arrow in FIG. 5) and into a dispensing tray for access by the customer. Shuttle 37 will continue to advance forward, pushing the next forward most coin roll of the horizontal row across coin proximity sensor 63 and through outlet 103, until the appropriate number of coin rolls has been dispensed. Specifically, shuttle 37 will stop pushing coins from the horizontal row when the number of coin rolls "counted" by coin proximity switch 63 equals the number of coin rolls ordered by the customer. At this time, shuttle 37 will stop at its current position, ready for quickly dispensing the next order of coin rolls. As can be seen, coins are dispensed almost instantly and much faster than from dispensers of the prior art because the next coin roll to be dispensed is virtually always only a short distance from the dispenser outlet 103, and shuttle 37 need only advance an inch or so in order to dispense the next coin roll.

In an alternative embodiment, coin proximity sensor 63 is eliminated and shuttle 37 remains controlled by PLC 65. In this embodiment, the number of coins dispensed is regulated as a function of the travel distance of shuttle 37 along lead screw 45. PLC 65, in this embodiment, dispenses preselected numbers of rolled coins by multiplying the number of coin rolls to be dispensed by a distance determined according to the width of a particular denomination of coin roll. Using this calculation, PLC 65 activates shuttle motor 39, setting shuttle 37 in motion, for a duration appropriate for dispensing the pre-selected number of coin rolls.

After the entire horizontal row of coins has been dispensed and front shuttle limit switch 59 has been contacted, shuttle motor 39 will automatically stop and reverse direction causing shuttle 37 to return to its original position at the rear of the dispenser. Once shuttle motor 37 has reached the starting position of the dispensing cycle at rear shuttle limit switch 61, elevator 5 will automatically advance the next uppermost roll of each vertical column of coins to a position just free of vertical partitions 3, thus forming another horizontal row of coin rolls ready for dispensing and continuing to dispense if the customer's order is larger than the number coin rolls that were available in the previous horizontal row.

In another embodiment of the subject invention, multiple rolled coin dispenser apparatuses 100 are included in one rolled coin dispensing machine. Each rolled coin dispenser apparatus 100 is then fitted to dispense a different denomination of coin roll, or each could dispense the same denomination. It is further noted that in the embodiment in which multiple rolled coin dispenser apparatuses 100 are dispensing multiple denominations of coin rolls from a single rolled coin dispensing machine, such a machine can dispense multiple denominations of coin rolls simultaneously.

Another embodiment of the subject invention is illustrated in FIGS. 6–9. Here, a coin loading cassette 200 for fast and efficient loading of coin rolls into magazine 1 of rolled coin dispenser apparatus 100 is provided. Generally speaking, coin loading cassette 200 is comprised of a rectangular box type structure substantially the length and width of magazine 1 of rolled coin dispenser apparatus 100. More specifically, coin loading cassette 200 comprises two side walls 209, two end walls 211, cassette bottom 212, and removable cassette lid 203. At one end of coin loading cassette 200, fixed in one of end walls 211 is a lock 205. Disposed within the coin loading cassette 200 are vertical partitions 201 extending perpendicular to side walls 209. Vertical partitions 201 are evenly spaced so that when rolls of coins are loaded within the vertical partitions 201, multiple vertical columns of horizontally stacked coin rolls are formed. In this particular embodiment, coin loading cassette 200 is of sufficient depth so that each vertical column of coins consists of four coin rolls. This depth will vary according to the denomination of the coin rolls to be stored or loaded. Optionally, coin loading cassette 200 may be of any depth sufficient to create vertical columns of coins of any desired roll height. Further, the spacing of vertical partitions 201 is substantially equal to that of vertical partitions 3 of the rolled coin dispenser apparatus 100 for which the coin loading cassette 200 is intended to be used.

Cassette lid 203 is slidably removable but otherwise secures to coin loading cassette 200 between side wall flanges 213 and end wall flanges 215. All of these flanges 213 and 215 extend perpendicular from their respective walls towards the center of the coin loading cassette 200. Cassette lid 203 may be secured to coin loading cassette 200 with lock 205 for security purposes.

Side wall flanges 213 include apertures or guide holes 207 for receipt of guide pins 207a which may be optionally included on rolled coin dispenser apparatus 100. Guide holes 207 when guide pins 207a are located therein aid in aligning coin loading cassette 200 for accurate loading of coins into rolled coin dispenser apparatus 100.

Normally, when loading coins into the rolled coin dispenser apparatus 100, magazine 1 is accessed by placing shuttle system frame 38 in the tilted or open position and exposing the top open end of magazine 1. Coin rolls are then manually loaded within vertical partitions 3 and a load/service button 73 is pushed which lowers the elevator 5 and thus the coin rolls into magazine 1. This process is repeated until the magazine 1 is full. When such large volumes of coins are handled, it is common to employ the use of security personnel for their transportation and loading and unloading. Companies which provide security personnel often charge varying rates for their services depending on the relative vulnerability and safety of the location. As an example, a security company might charge a much lesser rate for loading coins within a vault as compared to loading coins on site at a theme park or a casino. Therefore, employing security personnel to load coins into a rolled coin dispenser apparatus 100 as described above may be very costly in terms of high hourly rates. On the other hand, if the security personnel load coins into a coin loading cassette 200 within a vault at a much lower hourly rate, and then use such a coin loading cassette 200 to load coins quickly and efficiently on site into a rolled coin dispenser apparatus 100, substantial savings may be had due to the savings in hourly rate charges.

Figure 10:
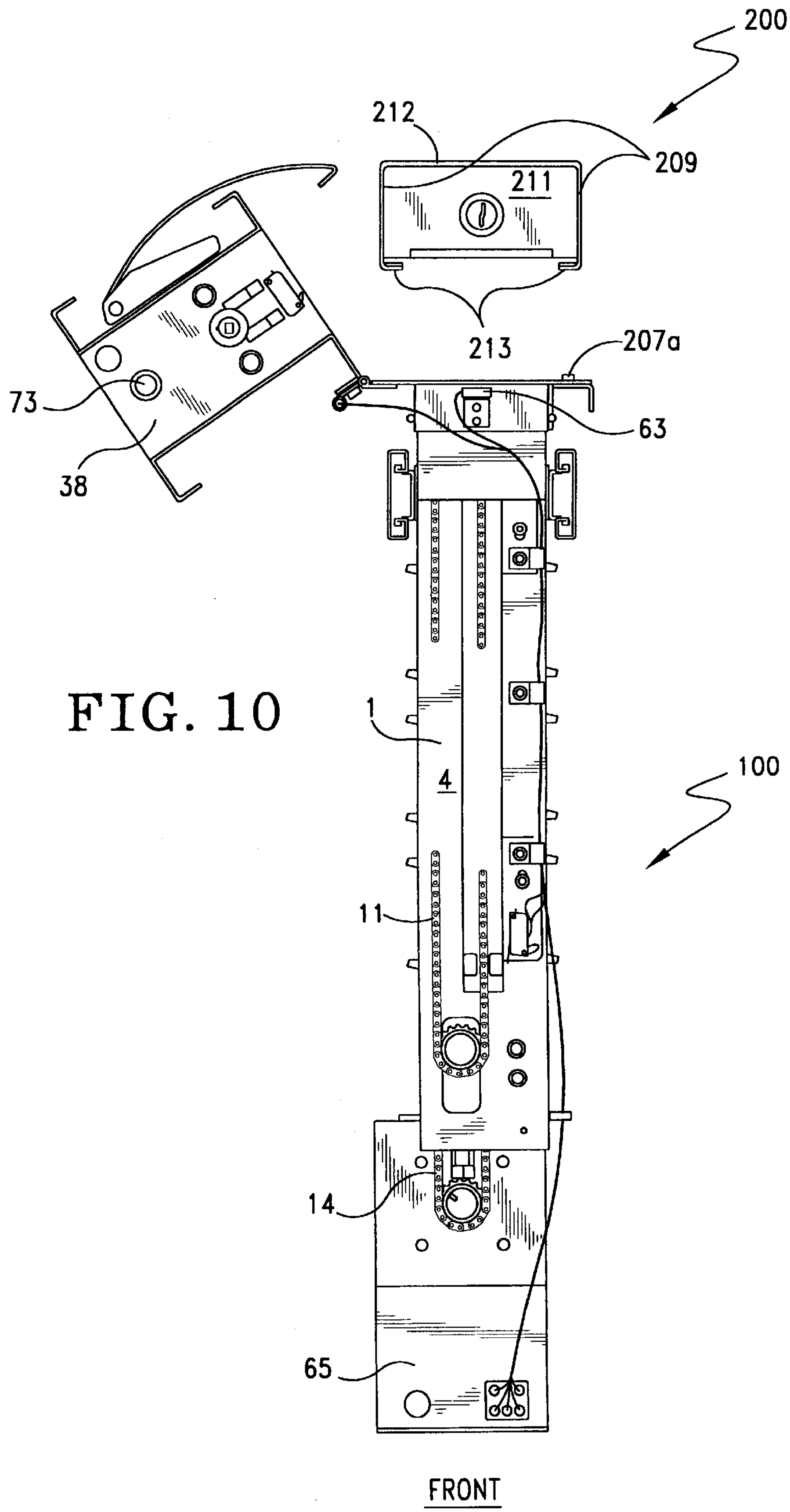
FIG. 10 is a partial front view of a rolled coin dispenser apparatus according to the subject invention shown with a coin loading cassette according to the embodiment of FIG. 6 in alignment for the rolled coin loading process.

Therefore, referring to FIG. 10, rather than manually loading each coin roll into the rolled coin dispenser apparatus 100 on site, one need simply place shuttle system frame 38 in the tilted or open position (the open top end of magazine 1 is exposed), and place a loaded coin loading cassette 200 upon the top of now exposed magazine 1, so that the apertures or guide holes 207 line up with optional guide pins or studs of rolled coin dispenser apparatus 100. Once coin loading cassette 200 is properly positioned, load/service button 73 is pushed and elevator 5 lowers the rolls of coins into magazine 1. Using this device, multiple horizontal rows of coin rolls may be loaded simultaneously, substantially reducing the length of time needed to load coins on site.

Once given the above disclosure, many other features, modifications, and improvements will become apparent to the skilled artisan. Such other features, modifications, and improvements are therefore considered to be part of this invention, the scope of which is to be determined by the following claims:

We claim:

1. A rolled coin dispenser apparatus comprising in combination:

(a) a magazine, said magazine including vertical partitions and being capable of storing multiple vertical columns of rolled coins within said vertical partitions;

(b) an elevator, said elevator being capable of movably supporting rolls of coins within said magazine at the bottom roll of each vertical column of coins, (c) an elevator motor for powering said elevator, (d) elevator controlling means for controlling said elevators vertical height by activating or deactivating said elevator motor, (e) sensing means for sensing said elevator's vertical height and for communicating with said controlling means, (f) a shuttle capable of pushing a pre-selected number of coin rolls from a horizontal row of rolls formed by the top roll of each vertical column of coins through an outlet for dispensing, (g) a shuttle motor for powering said shuttle, and (h) shuttle controlling means for controlling said shuttle by activating or deactivating said shuttle motor.

2. A rolled coin dispenser apparatus according to claim 1 further including a coin proximity sensor capable of communicating data to said controlling means and so located so that as coin rolls are dispensed, said coin proximity sensor is capable of sensing said coin rolls.

3. A rolled coin dispenser apparatus according to claim 2 wherein said coin proximity sensor is capable of communicating data to said controlling means when coins are located or passed proximate to said coin proximity sensor and said controlling means is capable of receiving said data, and in response thereto, regulating the number of coin rolls dispensed by controlling said shuttle.

4. A rolled coin dispenser apparatus according to claim 1 wherein said elevator sensing means comprises a sensor bar and at least one sensor bar switch, said sensor bar being capable of actuating said sensor bar switch when said sensor bar is contacted by a roll or rolls of coins.

5. A rolled coin dispenser apparatus according to claim 4 wherein said sensor bar switch is capable of communicating with said controlling means to regulate the vertical height of said elevator.

6. A rolled coin dispenser apparatus according to claims 1 or 3 wherein said controlling means comprises a computer and a PLC.

7. A rolled coin dispenser apparatus according to claim 6 wherein said sensing means comprises a sensor bar and at least one sensor bar switch, said sensor bar being capable of actuating said sensor bar switch when said sensor bar is contacted by a roll or rolls of coins, said sensor bar switch being capable of communicating with said PLC and said computer to regulate the vertical height of said elevator by activating or deactivating said elevator motor.

8. A rolled coin dispenser apparatus according to claims 1,2,3,4, or 5 further including a user interface capable of use by a customer for selecting a number of coin rolls to be dispensed.

9. A rolled coin dispenser apparatus according to claim 6 further including a user interface capable of use by a customer for selecting a number of coin rolls to be dispensed.

10. A rolled coin dispenser apparatus according to claim 7 further including a user interface capable of communicating to said controlling means a number of coin rolls to be dispensed as selected by a customer.

11. A rolled coin dispensing machine wherein multiple rolled coin dispensing apparatuses according to claims 1,2, 3,4, or 5 are utilized which is capable of dispensing multiple denominations of rolled coins simultaneously.

12. A rolled coin dispensing machine wherein multiple rolled coin dispensing devices according to claim 6 are utilized which is capable of dispensing multiple denominations of rolled coins simultaneously.

13. A rolled coin dispensing machine wherein multiple rolled coin dispensing devices according to claim 7 are utilized which is capable of dispensing multiple denominations of rolled coins simultaneously.

14. A rolled coin dispensing machine wherein multiple rolled coin dispensing devices according to claim 8 are utilized which is capable of dispensing multiple denominations of rolled coins simultaneously.

15. A rolled coin dispensing machine according to claim 11 wherein said controlling means comprises at least one PLC and a computer.

16. A rolled coin dispensing machine according to claim 15 further including a user interface capable of communicating to said PLC and said computer the number and denominations of coin rolls to be dispensed as selected by a customer.

17. A rolled coin dispensing machine according to claim 15 which is capable of storing at least 1800 rolls of coins of up to four denominations and is capable of dispensing multiple denominations of rolled coins simultaneously.

18. A rolled coin dispensing machine according to claim 16 which is capable of storing at least 1800 rolls of coins of up to four denominations and is capable of dispensing multiple denominations of rolled coins simultaneously.

19. A rolled coin dispenser apparatus according to claim 1 wherein said elevator is capable of automatically and simultaneously advancing the upper most roll of each vertical column of coins such that the upper most rolls are free of said vertical partitions of said magazine and form a horizontal row, whereby, when activated, said shuttle will push a pre-selected number of rolls of coins from the horizontal row into a dispensing tray, whereby when the entire horizontal row has been dispensed, said elevator will automatically advance the new upper most roll of each vertical column of coins to a position free of said partitions forming a new horizontal row and said shuttle will automatically reposition itself for further dispensing.

20. A rolled coin dispenser apparatus according to claim 19 wherein said sensing means comprises a sensor bar and at least one sensor bar switch and said controlling means comprises a PLC and a computer, whereby when a roll or rolls of coins contact said sensor bar, said sensor bar actuates said sensor bar switch, and said sensor bar switch communicates with said PLC and said computer to regulate the vertical height of said elevator by activating or deactivating said elevator motor.

21. A rolled coin dispensing apparatus according to claim 19 wherein coin rolls are dispensed across a coin proximity sensor, said coin proximity sensor being capable of communicating data to said controlling means when coins are located proximate to said coin proximity sensor or are passed across said coin proximity sensor and wherein said controlling means is capable of using said communicated data to regulate the number of coin rolls dispensed by controlling said shuttle.

22. A rolled coin dispensing apparatus according to claim 20 wherein coin rolls are dispensed across a coin proximity sensor, said coin proximity sensor being capable of communicating data to said controlling means when coins are located proximate to said coin proximity sensor or are passed across said coin proximity sensor and wherein said controlling means is capable of using said communicated data to regulate the number of coin rolls dispensed by controlling said shuttle.

23. A rolled coin dispensing machine wherein multiple rolled coin dispensing apparatuses according to claims 19, 20,21, or 22 are utilized which is capable of dispensing multiple denominations of rolled coins simultaneously.

24. A rolled coin dispensing machine according to claim 23 further including a user interface capable of communicating to said controlling means the number and denominations of coin rolls to be dispensed as selected by a customer.

25. A rolled coin dispensing machine according to claim 24 which is capable of storing at least 1800 rolls of coins of up to four denominations and is capable of dispensing multiple denominations of rolled coins simultaneously.

26. A method of loading coins into a rolled coin dispenser apparatus according to claims 1, 2, 3, 4, or 5 with a rolled coin loading cassette comprising:

a coin storage compartment including vertical partitions capable of storing multiple horizontally stacked vertical columns of rolled coins and a lid which is slidably removable, wherein said method comprises:

aligning said rolled coin loading cassette atop said rolled coin dispenser apparatus, and slidably removing said lid.

27. A rolled coin loading cassette comprising:

a coin storage compartment including vertical partitions capable of storing multiple horizontally stacked vertical columns of rolled coins and a lid which is slidably removable from said cassette whereby when said lid is removed, coins may be loaded into said partitioned coin storage compartment and stored by replacing said removable lid; and whereby coins may be quickly deposited into a rolled coin dispenser apparatus by aligning said rolled coin loading cassette with a rolled coin dispenser apparatus and slidably removing said lid, said loading cassette further comprising apertures for receipt of guide pins provided on said rolled coin dispenser apparatus for aligning said cassette in dispensing position with respect to said dispenser apparatus.

28. A method of loading coins into a rolled coin dispenser apparatus with a rolled coin loading cassette according to claim 27 comprising:

placing said rolled coin loading cassette which is loaded with coins atop of said rolled coin dispenser apparatus such that said apertures receive said guide pins of said rolled coin dispenser apparatus, and slidably removing said lid.

* * * * *